United States Patent
Phipps (10) Patent No.: US 7,422,285 B2
(45) Date of Patent: Sep. 9, 2008

(54) VEHICLE SEATING SYSTEM AND METHOD FOR REDUCING FATIGUE

(75) Inventor: Paul Phipps, Fishers, IN (US)

(73) Assignee: Innovative Biomechanical Solutions, L.L.C., Indianapolis, IN (US)

( * ) Notice: Subject to any disclaimer, the term of this patent is extended or adjusted under 35 U.S.C. 154(b) by 297 days.

(21) Appl. No.: 11/241,264

(22) Filed: Sep. 30, 2005

(65) Prior Publication Data

US 2007/0132289 A1 Jun. 14, 2007

(51) Int. Cl.
*A47C 7/40* (2006.01)

(52) U.S. Cl. .............. 297/284.1; 297/217.3; 297/284.3

(58) Field of Classification Search .............. 297/284.1, 297/284.3, 217.1, 217.3, 284.4
See application file for complete search history.

(56) References Cited

U.S. PATENT DOCUMENTS

| | | | |
|---|---|---|---|
| 4,722,550 A | 2/1988 | Imaoka et al. | |
| 5,005,904 A | 4/1991 | Clemens et al. | |
| 5,127,708 A * | 7/1992 | Kishi et al. | 297/284.1 |
| 5,129,704 A * | 7/1992 | Kishi et al. | 297/284.1 |
| 5,155,685 A | 10/1992 | Kishi et al. | |
| 5,243,267 A | 9/1993 | Ogasawara | |
| 5,320,409 A * | 6/1994 | Katoh et al. | 297/284.6 |
| 5,321,617 A | 6/1994 | Mori et al. | |
| 5,411,468 A | 5/1995 | Chen | |
| 5,455,494 A | 10/1995 | Ogasawara | |
| 5,490,713 A | 2/1996 | Fukuoka | |
| 5,498,061 A | 3/1996 | Fukuoka | |
| 5,507,557 A | 4/1996 | Fukuoka | |
| 5,516,192 A | 5/1996 | Fukuoka | |
| 5,523,664 A * | 6/1996 | Ogasawara | 318/590 |
| 5,533,784 A | 7/1996 | Fukuoka | |
| 5,542,741 A | 8/1996 | Fukuoka | |
| 5,556,161 A | 9/1996 | Fukuoka | |
| 5,637,076 A | 6/1997 | Hazard et al. | |
| 5,647,633 A | 7/1997 | Fukuoka | |
| 5,812,399 A * | 9/1998 | Judic et al. | 701/49 |
| 5,816,653 A | 10/1998 | Benson | |
| 5,930,152 A | 7/1999 | Dumont et al. | |
| 6,007,151 A | 12/1999 | Benson | |
| 6,033,021 A | 3/2000 | Udo et al. | |
| 6,049,748 A | 4/2000 | Newman et al. | |
| 6,053,880 A | 4/2000 | Sleichter, III | |
| 6,055,473 A | 4/2000 | Zwolinski et al. | |
| 6,129,419 A * | 10/2000 | Neale | 297/284.4 |
| 6,497,454 B1 * | 12/2002 | Davidsson | 297/284.3 |
| 6,682,494 B1 | 1/2004 | Sleichter, III et al. | |
| 6,814,410 B2 | 11/2004 | Piaulet et al. | |

(Continued)

OTHER PUBLICATIONS

International Search Report for PCT/US06/37475, dated Jul. 16, 2007, 3 pages.

(Continued)

*Primary Examiner*—David R Dunn
(74) *Attorney, Agent, or Firm*—Woodard, Emhardt, Moriarty, McNett & Henry LLP (57) ABSTRACT

A vehicle seating system can be used within a variety of vehicles to reduce positional fatigue and other effects of long distance traveling. Such a system includes a typical vehicle seat mountable in a vehicle, at least two powered seat adjustment actuators, and an electrical controller. The actuators are moveable to alter the seating position formed by the seat, thereby reducing fatigue experienced by a vehicle traveler.

23 Claims, 12 Drawing Sheets

U.S. PATENT DOCUMENTS

| | | |
|---|---|---|
| 7,145,263 B2 | 12/2006 | Nathan et al. |
| 7,152,920 B2 * | 12/2006 | Sugiyama et al. ........ 297/284.6 |
| 7,172,247 B2 | 2/2007 | Beloch et al. |
| 2002/0070591 A1 | 6/2002 | Nivet |
| 2002/0190549 A1 | 12/2002 | Chien-Chuan |
| 2003/0075959 A1 | 4/2003 | Xue et al. |
| 2004/0122574 A1 | 6/2004 | Inman et al. |
| 2005/0127728 A1 | 6/2005 | Sugiyama et al. |
| 2007/0241595 A1 | 10/2007 | Nathan et al. |

OTHER PUBLICATIONS

Written Opinion for PCT/US06/37475, dated Jul. 16, 2007, 4 pages.

* cited by examiner

VEHICLE SEATING SYSTEM AND METHOD FOR REDUCING FATIGUE

FIELD OF THE INVENTION

The present invention relates to vehicle seat position adjustment systems and methods, and in particular a system and method for moving between various vehicle seat positions to reduce fatigue.

BACKGROUND OF THE INVENTION

Vehicle passengers and drivers often experience various effects of traveling in a vehicle, and in particular, due to long distance traveling. These effects can include muscle fatigue and other related problems resulting from a person's body being in a stationary position for relatively long periods of time. The fatigue experienced by different muscle groups while traveling can be problematic for a vehicle user. Many travelers often find themselves adjusting their body in the vehicle seat or adjusting various seat adjustment actuators individually, attempting to achieve greater traveling comfort. Adjusting his or her seat position can be distracting for a driver of a vehicle. Moreover, remaining in a stationary position for long periods of time can have negative effects on a vehicle traveler's health. As an example, reducing fatigue of muscle groups can reduce the chance of blood clot formation and various other ailments. Reducing fatigue aids a driver of a vehicle in staying alert.

There is a need for an improved vehicle seat position adjustment system. Certain embodiments address these and other needs.

SUMMARY OF THE INVENTION

Certain embodiments include a vehicle seating system for reducing user fatigue, comprising a seat mountable in a vehicle, at least two powered seat adjustment actuators, and an electrical controller for activating movement of the actuators. Each actuator is movable between a first position and a second position to alter the seating position formed by the seat, thereby reducing positional fatigue. The actuators reposition the seat to different seating positions with a slow movement average of less than about 10 centimeters per second when the actuators travel between the first positions and the second positions. In certain embodiments, the electrical controller has a control period and the control period has at least one fatigue period of at least ten minutes. In such embodiments, the controller automatically activates the slow movement average of the actuators between the first and second positions at least once both before and after a fatigue period. The invention is set forth by the claims, and it is not limited by the foregoing.

It is an object of certain embodiments to provide an improved vehicle seat position adjustment system and method.

BRIEF DESCRIPTION OF PREFERRED EMBODIMENTS

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A vehicle seating system can be used within a variety of vehicles to reduce user fatigue and other effects of long distance traveling. Such a system includes a typical vehicle seat mountable in a vehicle, at least two powered seat adjustment actuators, and an electrical controller. Various embodiments of the system can be used within automobiles, trains, and/or airplanes, as examples. The actuators are moveable to alter the seating position formed by the seat, reducing positional fatigue of the user. The actuators preferably reposition the seat to different seating positions with a slow movement average of typically less than about 10 centimeters per second. The electrical controller has a control period which generally includes at least one movement period and, in certain embodiments, at least one stationary period. In a typical embodiment, the electrical controller initiates the control period after a first time period beginning when the vehicle is turned on. Thereafter, the control period preferably includes at least one movement period where the actuators automatically cycle through seating positions and reposition the user to reduce long distance traveling fatigue.

Figure 1:
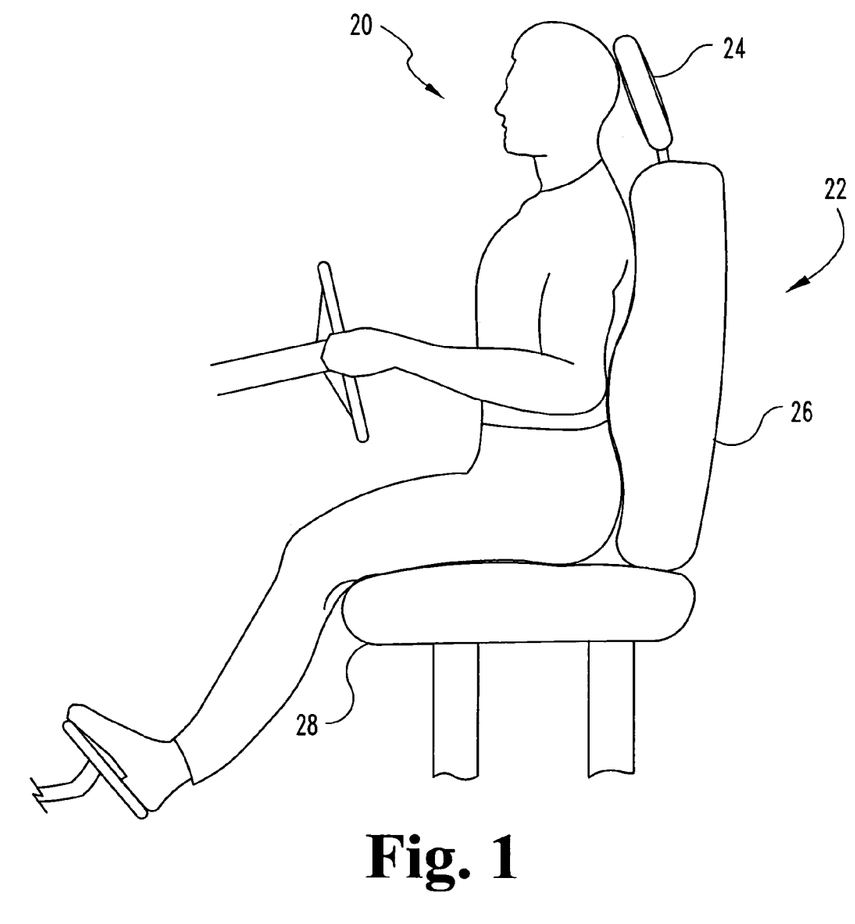
FIG. 1 is a perspective view of a vehicle seat and a user seated therein.

FIG. 1 illustrates a vehicle user 20 seated in a vehicular seat 22. A typical vehicular seat includes a head rest 24, a seat back 26, and a seat bottom 28. As illustrated in FIG. 1, the user is operating a motor vehicle by using a typical steering wheel and pedal system.

Figure 2:
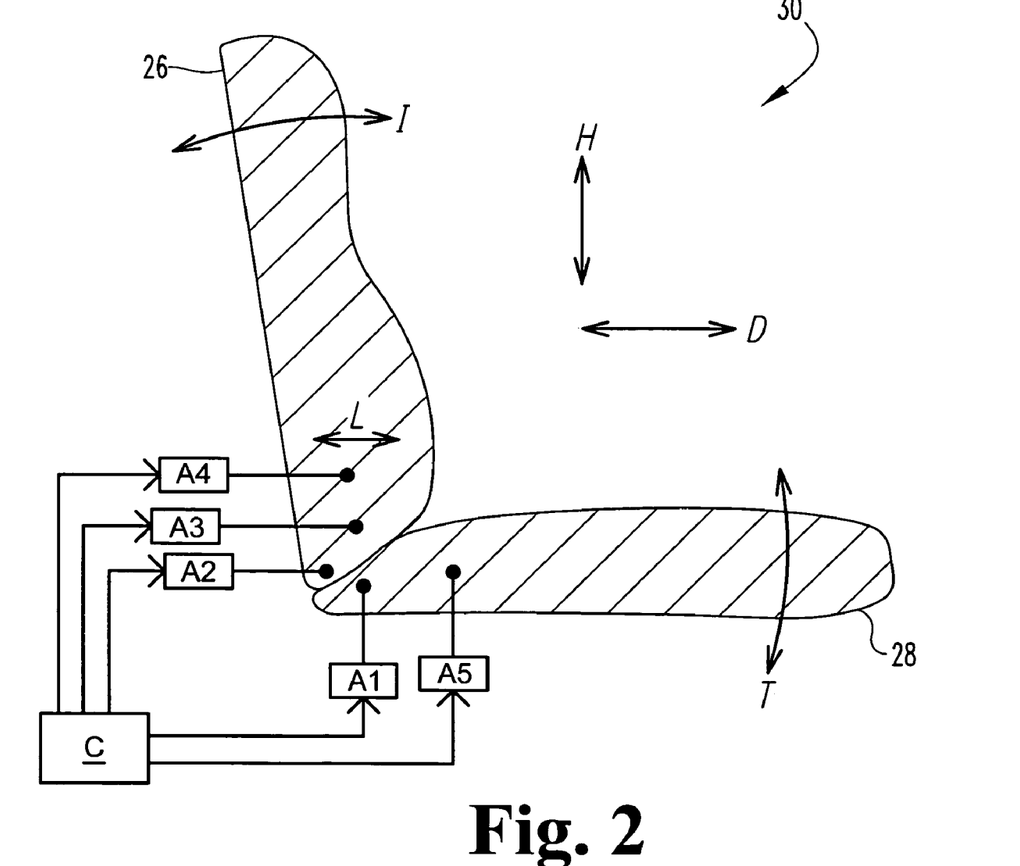
FIG. 2 is a side, partial cross-sectional view of a vehicle seating system embodiment.

FIG. 2 illustrates components of a vehicle seating system 30 designed to reduce user positional fatigue. It should be appreciated that the system can be associated with any type of vehicular seat. System 30 includes various powered seat adjustment actuators configured to move seat back 26 and seat bottom 28 in various manners, thereby altering the seating position formed by the seat. Certain typical embodiments include five actuators, such as a first actuator A1 to move both the seat back and the seat bottom in a generally vertical direction along a height axis H and a second actuator A2 to move both the seat back and the seat bottom in a generally horizontal direction along distance axis D. Movement along the distance axis D alters the distance that the seat is positioned relative to a steering wheel and pedal system for a driver's seat. A third actuator A3 is configured to move a lumbar region of the seat back along a lumbar axis L. A fourth actuator A4 and a fifth actuator A5 operate to incline or tilt the seat back along an I axis and the seat bottom along a T axis, respectively. The actuator power may be by motor, servo motor, sdepper motor, pneumatics, hydraulics, or otherwise.

In preferred embodiments, movement of the actuators includes a slow movement average of less than about 10 centimeters per second. In certain embodiments, each actuator moves from a first position to a second position, and cycling of the actuators includes movement from the first positions to the second positions and returning to the first positions. In certain embodiments, the first position of each actuator is a base position and the second position of each actuator is the opposite, completely extended position of each actuator along the respective axis. However, in certain other embodiments, the first position of each actuator is a desired position, predetermined by the system or a user of the system.

System 30 generally includes an electrical controller C to automatically activate, operate, and cycle through the various actuators in a manner as to reduce positional fatigue. The electrical controller operates in conjunction with a microprocessor and/or computer chip technology to operate the system. The electrical controller preferably includes a control period. In certain preferred embodiments, the electrical controller initiates the control period when the vehicle is turned on. The control period can include a first stationary time period before movement begins. In certain other preferred embodiments, the electrical controller initiates the control period after passage of a first stationary time period, the first time period beginning when the vehicle is turned on. In certain preferred embodiments, the first stationary time period is about 20 minutes. In other preferred embodiments, the first stationary time period is about 30 minutes. However, it should be appreciated that the control period can begin at other appropriate times as would generally occur to one skilled in the art.

In certain embodiments, the control period includes at least one fatigue period of at least ten minutes. In a preferred embodiment, the fatigue period includes at least one segment of time in which at least one actuator is moving to reposition the vehicle seat. The control period preferably includes at least one movement period, the movement period including movement of at least one actuator. In certain preferred embodiments, the control period includes at least one movement period and at least one stationary period in which the actuators are motionless. In certain embodiments, the stationary period is at least 5 minutes in duration. In certain embodiments, the control period ends when the vehicle is turned off.

In certain preferred embodiments, the electrical controller is activated automatically when the vehicle is turned on. Additionally, the electrical controller can preferably be manually activated and de-activated by a user of the system. In such embodiments, a user of the system can manually switch the electrical controller on and off as desired. Additionally, in certain embodiments, the electrical controller is de-activated when the vehicle is turned off.

Figure 3:
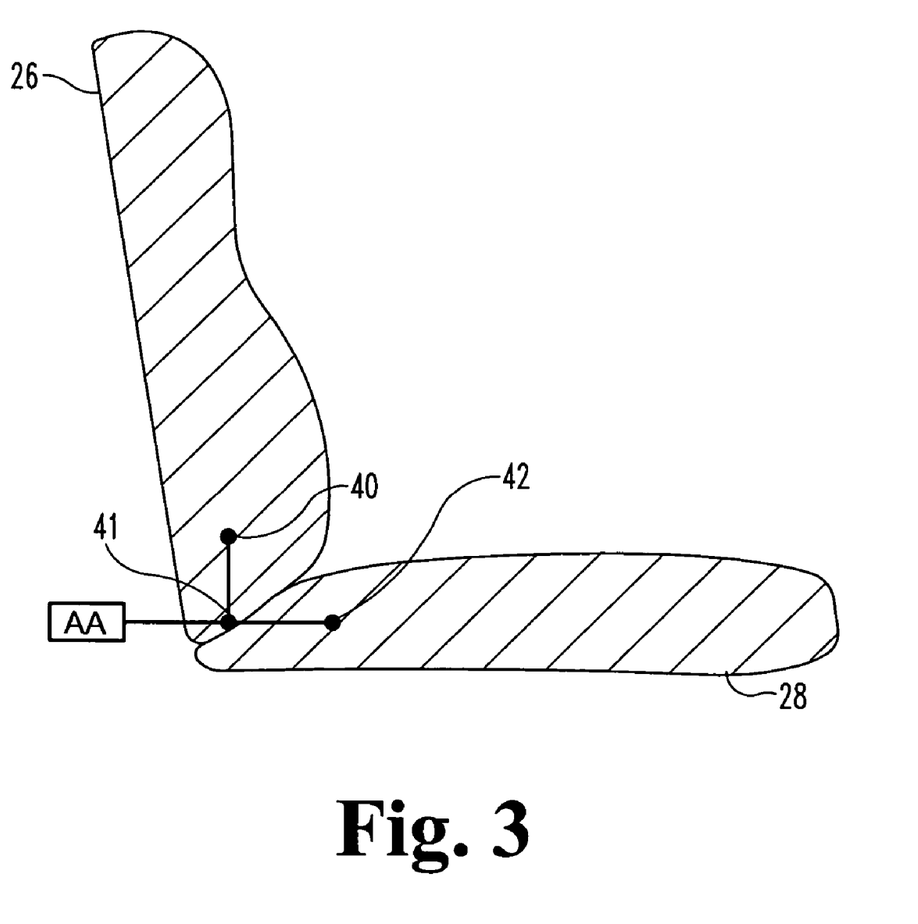
FIG. 3 is a side, partial cross-sectional view of another vehicle seating system embodiment.

FIG. 3 illustrates an alternative embodiment in which one actuating means AA, such as one power cylinder, is used to move the seat back and seat bottom to various seating positions through the use of various mechanical linkages such as bell cranks, worm gears, cams, etc. The actuating means AA and the mechanical linkages can be configured to cause movement at different actuating points, such as actuating points 40, 41, and 42, through the use of one actuating means. In other words, there may be one actuating means and more than one actuator at points 40, 41, and 42, for example. It is possible to link the actuators, as shown in FIG. 3; however, in certain preferred embodiments, the actuators operate independent of each other, as in FIG. 2.

FIGS. 4-12 are graphic illustrations of various embodiments of a vehicle seating system. The figures illustrate movement of various actuators along a horizontal Time axis and a vertical Movement axis. The Movement axes generally include a "1" denoting a first position and a "2" denoting a second position, and certain figures include delineations along the Movement axes denoting partial movement between the first and second positions. It should be appreciated that the first and second positions can be various combinations of actuators and activation position levels thereof, and can be randomly chosen or predetermined by the system or a user of the system. They could be full stroke or partial stroke (or rotation) of the actuators. In certain preferred embodiments, the transition time for the actuators to move from the first positions to the second positions is in the range of 20-40 seconds.

FIGS. 4-12 represent only a few of numerous embodiments of actuator movement profiles of a vehicle seating system as described herein. In the illustrated embodiments, optionally a first time period passes before movement on Movement Axis M between positions 1 and 2 of one or more actuators begins. In certain embodiments, the initial movement of one or more actuators is the beginning of the control period. In certain other embodiments, the control period includes an initial period of time of inaction of the actuators. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of actuators illustrated in the figures. It should be appreciated that the embodiments illustrated in the figures can include movement of a different number of actuators as would occur to one skilled in the art. Also, although the movement profiles illustrated in FIGS. 4-12 are linear segments, they may optionally include curvilinear segments as well. In preferred embodiments, the actuators move with a slow movement speed average of less than about 10 centimeters per second. Additionally, it should be appreciated that the activity of the actuators illustrated in the figures can continue indefinitely along the Time axis, with only a segment of the activity shown for clarity. Also, any and all of the profiles in FIGS. 4-12 and otherwise may be combined with each other.

Figure 4:
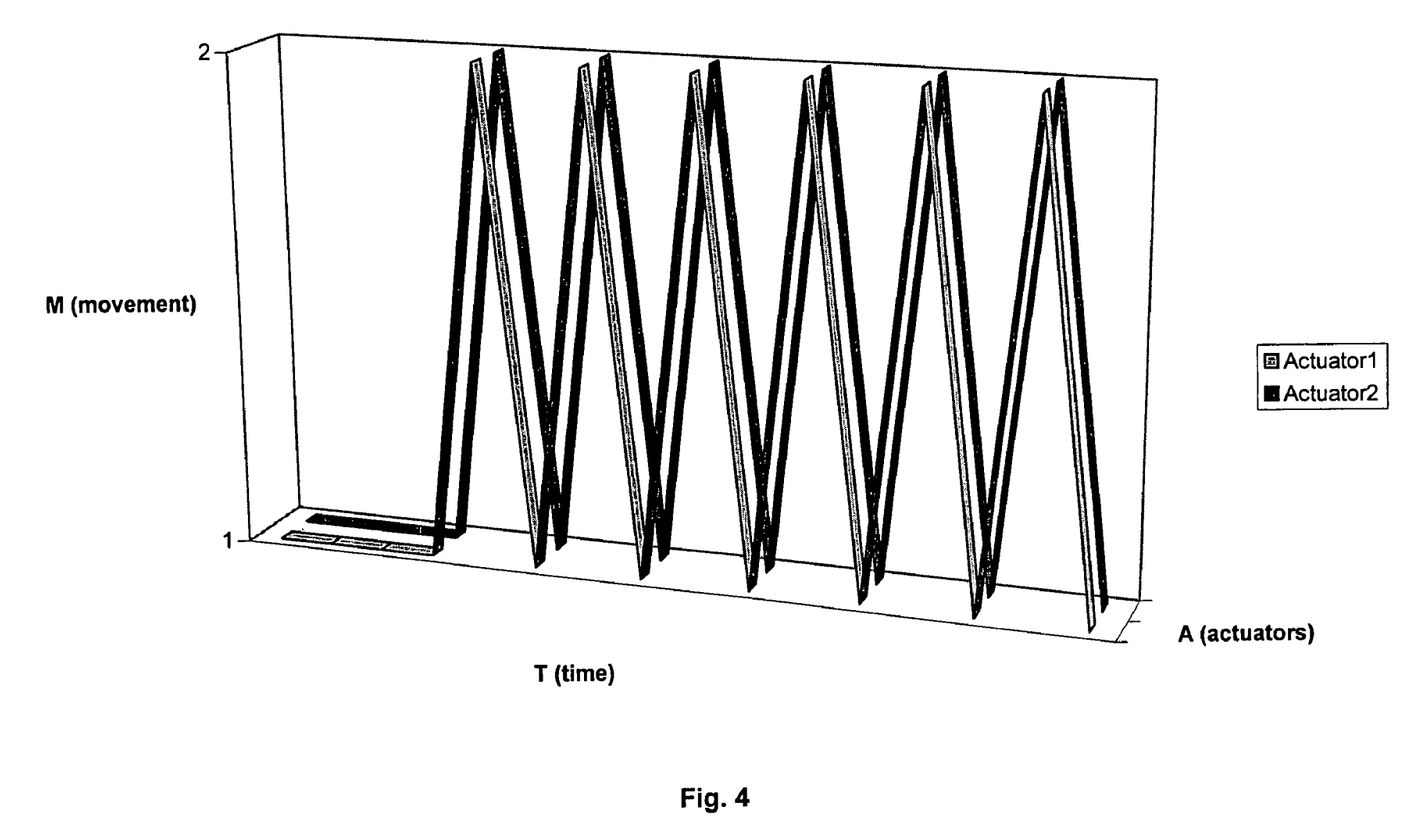
FIGS. 4-12 are graphic illustrations of various examples of movement profiles of a vehicle seating system herein.

The control period illustrated in FIG. 4 includes one continuous movement period, wherein at least one actuator is moving through different seating positions. FIG. 4 illustrates two such actuators; however, it should be appreciated that a different number of actuators can reposition the seat during the movement period. The movement period illustrated in FIG. 4 includes cycling of the various actuators from first positions to second positions continually until the control period ends. In certain preferred embodiments, the movement period illustrated in FIG. 4 includes movement of at least two seat adjustment actuators.

Figure 5:
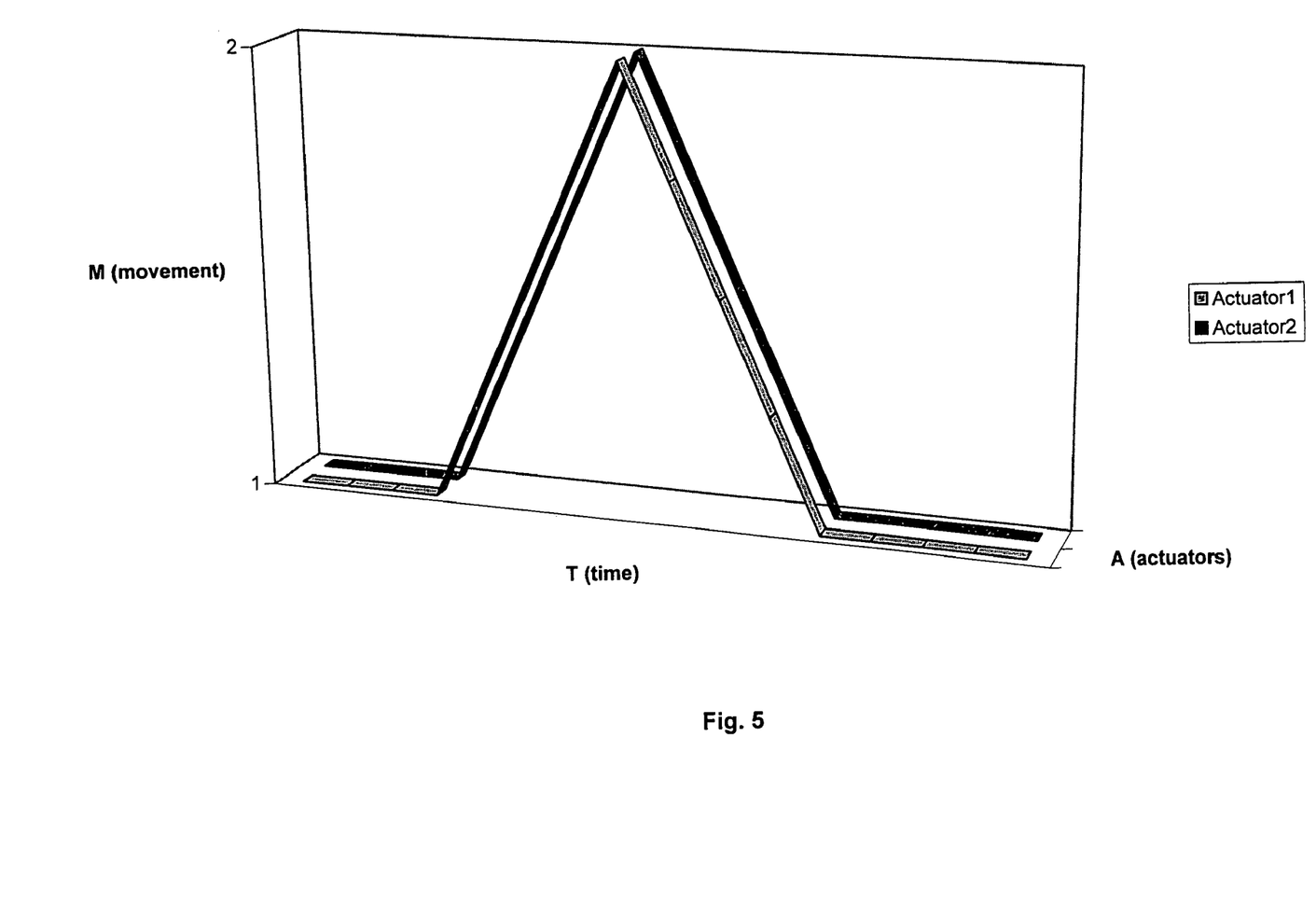

FIG. 5 is a graphic illustration of another possible embodiment of a vehicle seating system. In the embodiment illustrated in FIG. 5, the control period includes a movement period followed by a stationary period of inaction of the actuators. It should be appreciated that this movement period and stationary period alternating combination can continue along the Time axis. The illustrated movement period includes cycling of the actuators from respective first positions to second positions, and returning to the first positions. The embodiment illustrated in FIG. 5 includes relatively slow cycling of the actuators to reduce positional fatigue of a user without significant disruption to the user.

Figure 6:
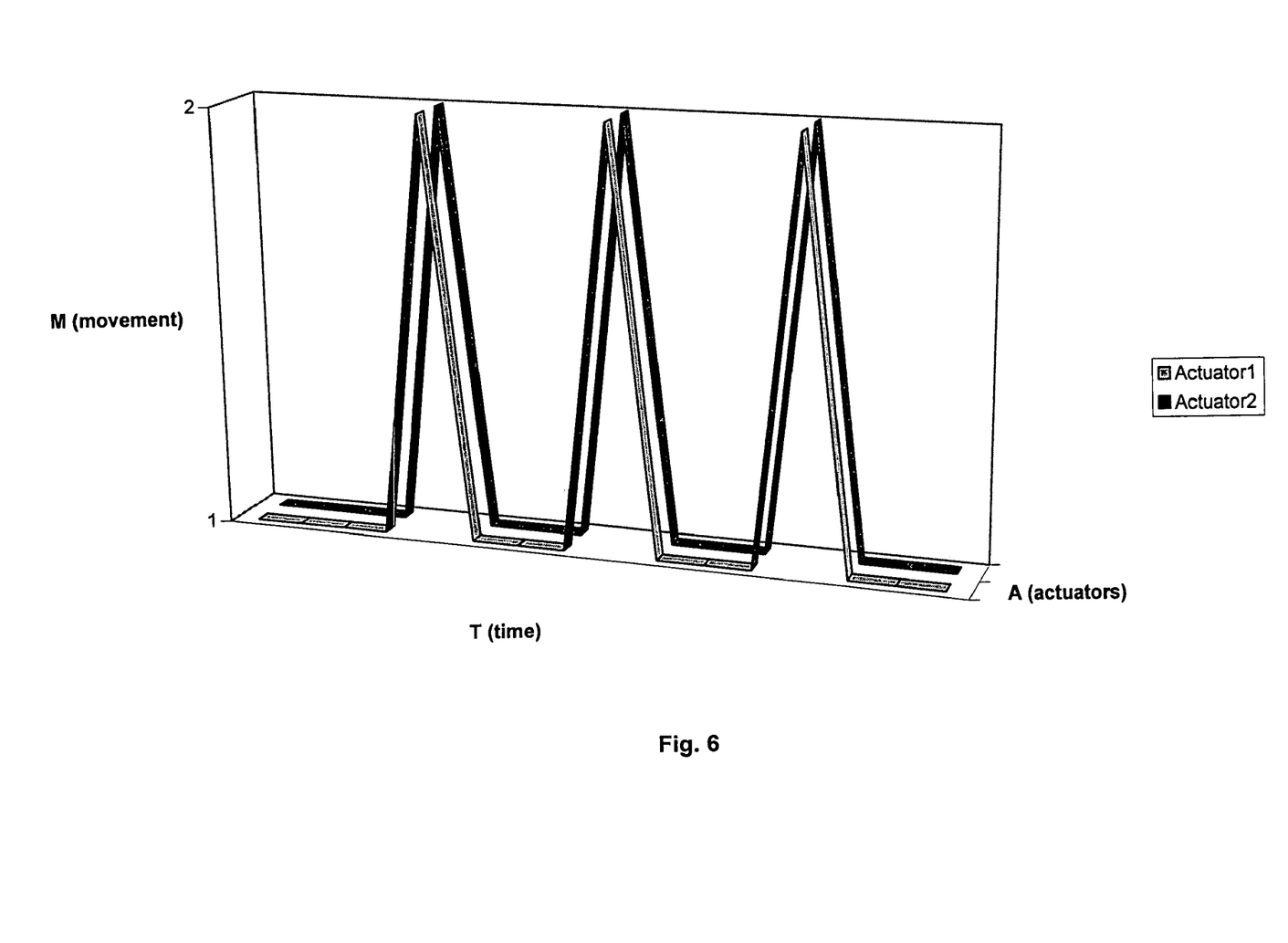

In the embodiment illustrated in FIG. 6, the control period includes alternating movement periods and stationary periods. In certain preferred embodiments, each movement period includes cycling of the actuators from first positions to second positions and returning to first positions. In such embodiments, each stationary period includes static positioning of the actuators at the first positions. However, it should be appreciated that, in certain alternative embodiments, a movement period can include movement of the actuators from first positions to second positions, and a next consecutive movement period can include movement of the actuators from second positions to first positions, with such a continuing alternating pattern. Additionally, in certain alternative embodiments, the movement periods can include other segments of the cycling from first positions to second positions, with stationary periods occurring therebetween.

Figure 7:
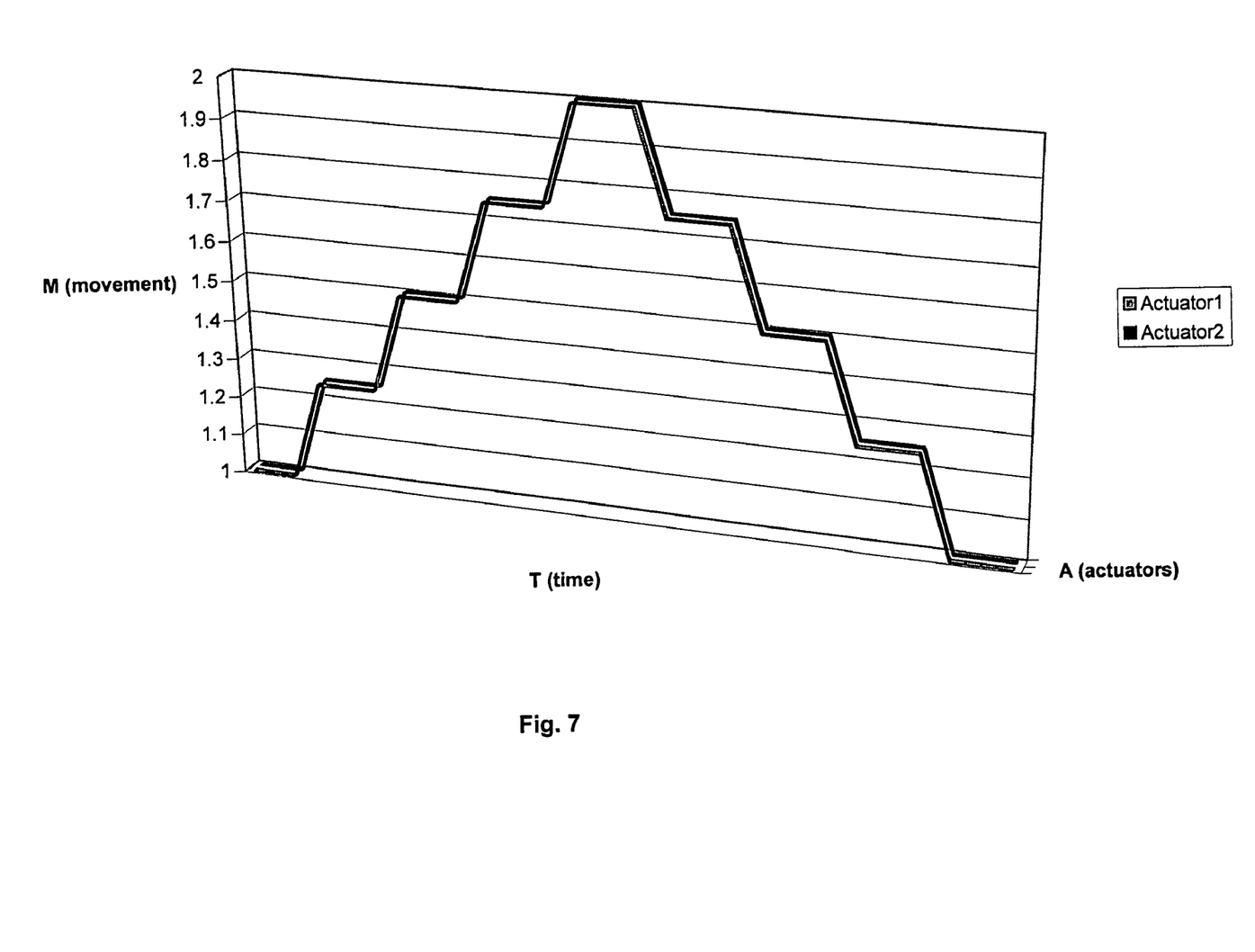

FIG. 7 is a graphic illustration of yet another possible embodiment of a vehicle seating system. In the embodiment illustrated in FIG. 7, the control period includes alternating movement periods and stationary periods. In certain preferred embodiments, each movement period includes slight movement of at least one actuator along a segment of the distance between the first and second positions. The movement periods begin with the at least one actuator moving from a first position toward a second position, and returning toward a first position, with stationary periods occurring throughout. In certain embodiments, the stationary periods are longer in duration than the movement periods, as illustrated. In the illustrated embodiment, the movement periods include movement equivalent to a quarter segment of the distance between the first and second positions. However, it should be appreciated that the movement periods can include different length segments as would occur to one skilled in the art, including different lengths than the illustrated embodiment and/or different lengths within the same control period for different movement periods.

Figure 8:
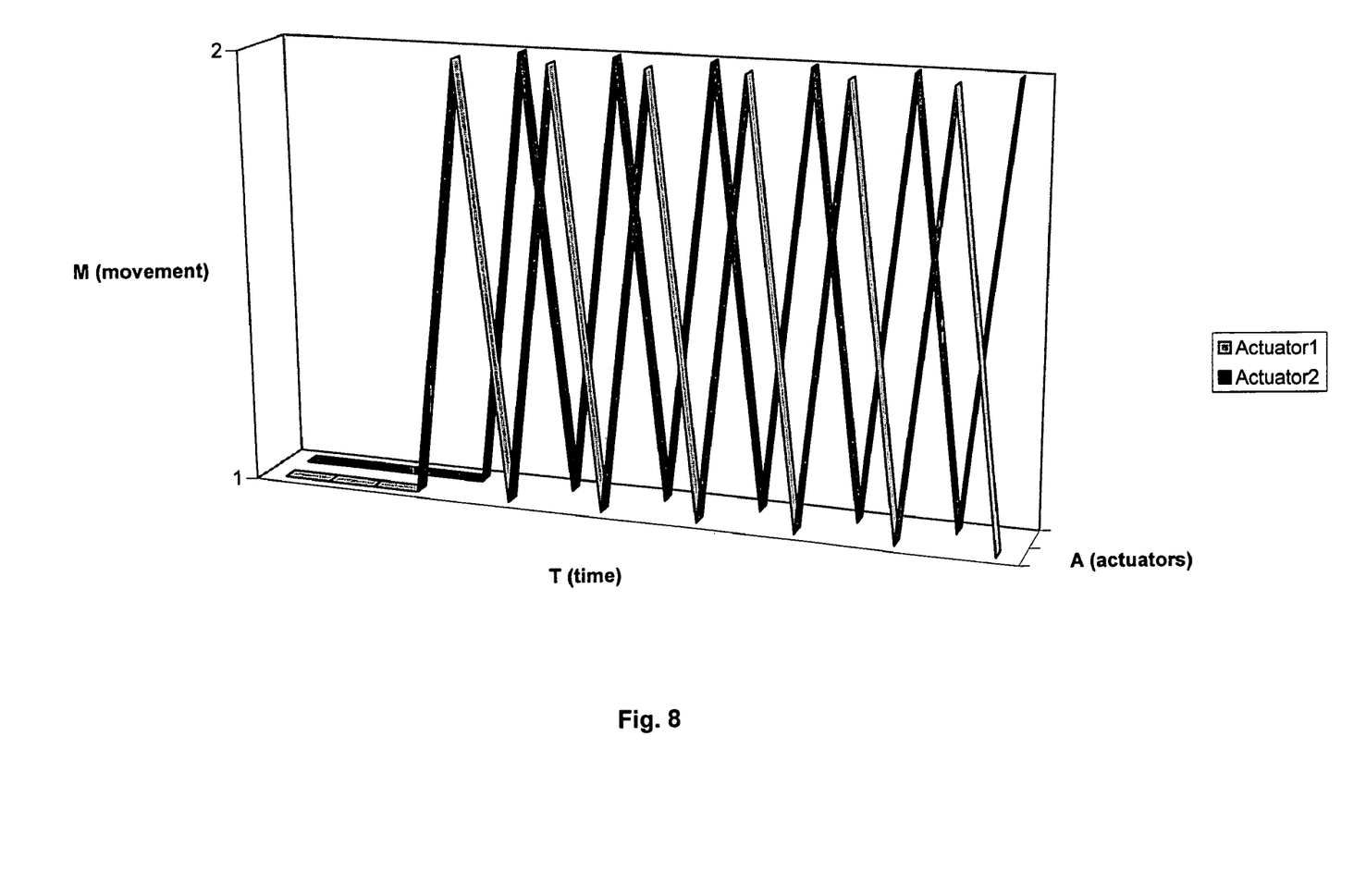

In the embodiment illustrated in FIG. 8, the control period includes one continuous movement period, wherein the actuators are moving through different seating positions, with one actuator moving before another. FIG. 8 illustrates two such actuators; however, it should be appreciated that a different number of actuators can reposition the seat during the movement period. The movement period illustrated in FIG. 8 includes cycling of the various actuators from first positions to second positions continually until the control period ends. In preferred embodiments, the actuators move such that certain actuators reach first positions when various other actuators reach second positions, and vice versa. In certain preferred embodiments, the movement period illustrated in FIG. 8 includes movement of at least two seat adjustment actuators.

Figure 9:
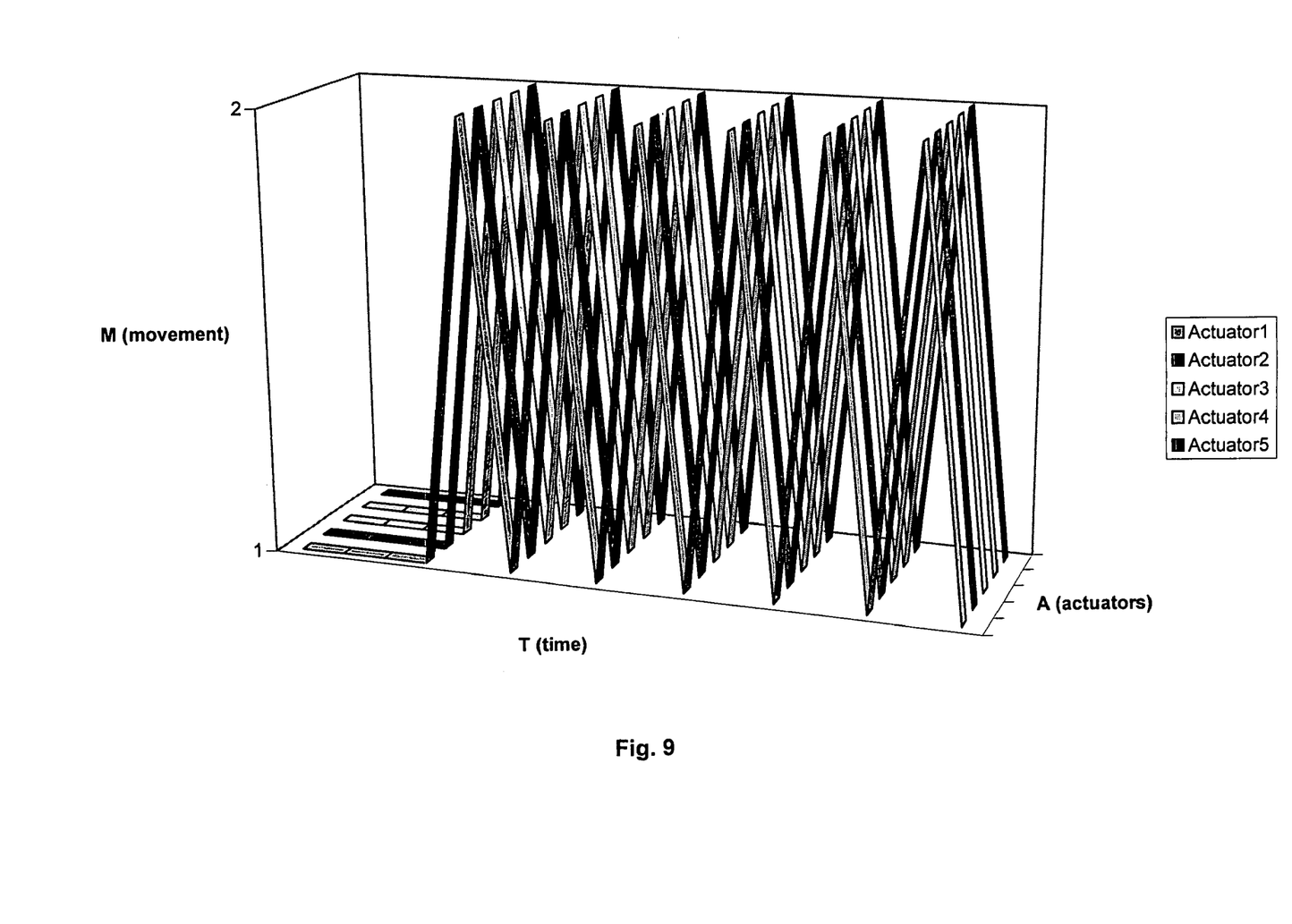

FIG. 9 is a graphic illustration of even another possible embodiment of a vehicle seating system. The control period illustrated in FIG. 9 includes one continuous movement period, wherein the actuators are moving simultaneously through different seating positions. In certain embodiments, the five actuators illustrated in FIG. 9 are the five actuators described in connection with FIG. 2. The movement period illustrated in FIG. 9 includes cycling of the various actuators from first positions to second positions, and back to first positions, continually until the control period ends and with a relatively slow movement average.

Figure 10:
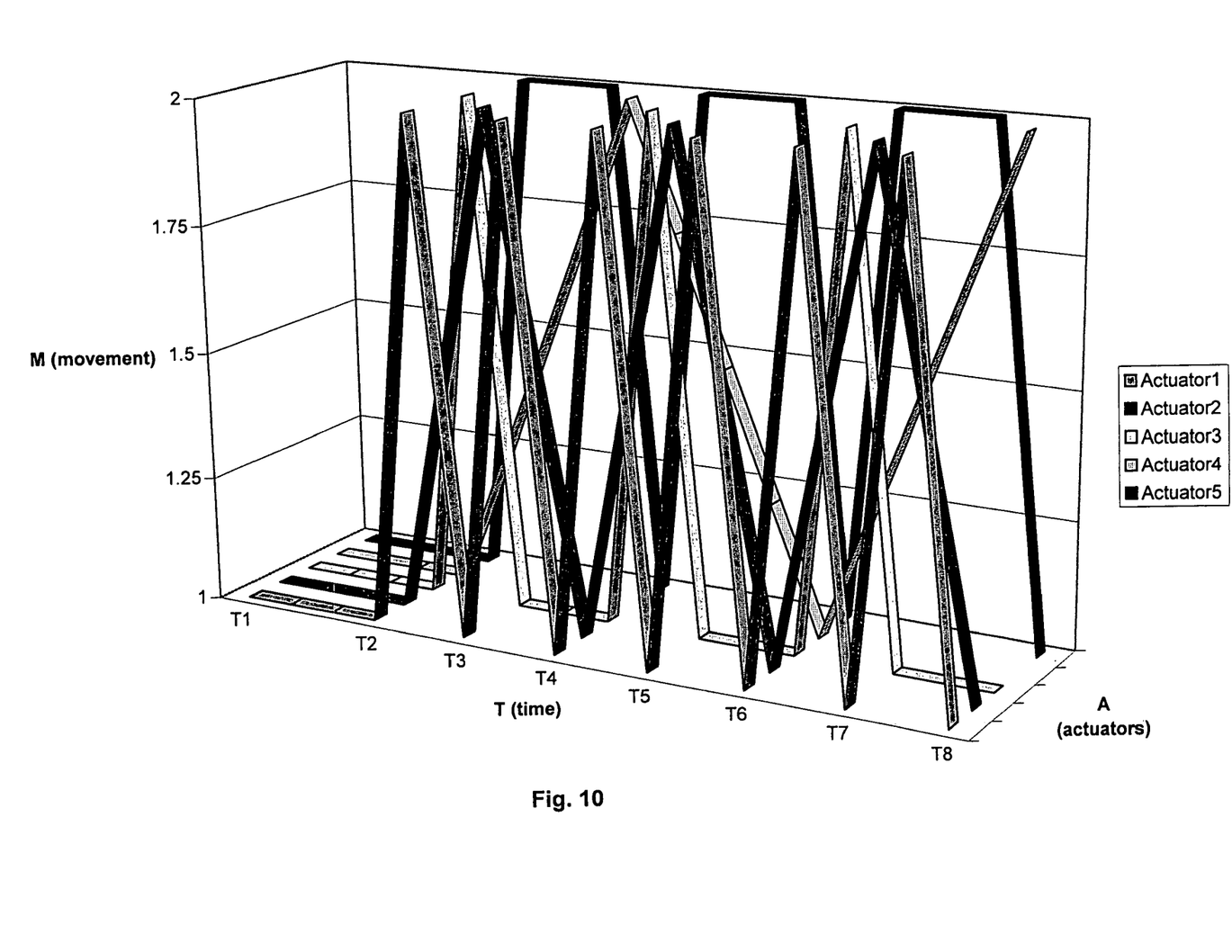

In the embodiment illustrated in FIG. 10, the control period includes various combinations of movement periods and stationary periods, wherein the actuators are moving through different seating positions. The movement period illustrated in FIG. 10 includes cycling of the various actuators from first positions to second positions, with some actuators having stationary periods at certain positions. FIG. 10 is illustrative of the possibility of the various actuators being activated to move at different speeds, and with different combinations of movement periods and stationary periods. Additionally, in certain embodiments, a user can preprogram various desired seating positions to be cycled through. Preferably, a user can set each actuator to a desired position, with the actuators collectively defining a preprogrammed seating position. In other embodiments, the seating positions are chosen at random by the system.

FIG. 10 illustrates times T1 through T8. In certain preferred embodiments, the vehicle is turned on at time T1, with electrical controller C being activated and initiating a control period at time T1. In the illustrated embodiment, a first stationary period occurs from time T1 to time T2, in which the actuators remain motionless at position 1, and movement periods begin at time T2. During the movement periods, the actuators cycle at various speeds and through various positions. In the illustrated embodiment, for example, actuator 1 cycles continuously through a single movement period from time T2 to T8, while actuator 5 includes alternating movement periods and stationary periods. Additionally, as a possible example, from time T2 to time T3, actuator 1 cycles from position 1 to position 2 and back to position 1, while actuator 5 cycles from position 1 to position 2 relatively quickly and then remains at position 2 through time T3. Actuator 5 then returns relatively quickly to position 1 at time T4, with this pattern continuing through the movement periods and stationary periods. However, it should be appreciated that other patterns can be implemented for the actuators as would occur to one skilled in the art and/or as desired by a user of the system. Additionally, it should be appreciated that the various movement patterns of the actuators can be randomly chosen by the vehicle seating system or can be pre-programmed by a user of the system. For brevity, the discussion of a control period including times T1 through T8, and the examples discussed herein, have been provided in conjunction with FIG. 10, but similarly apply to FIGS. 4-12.

Figure 11:
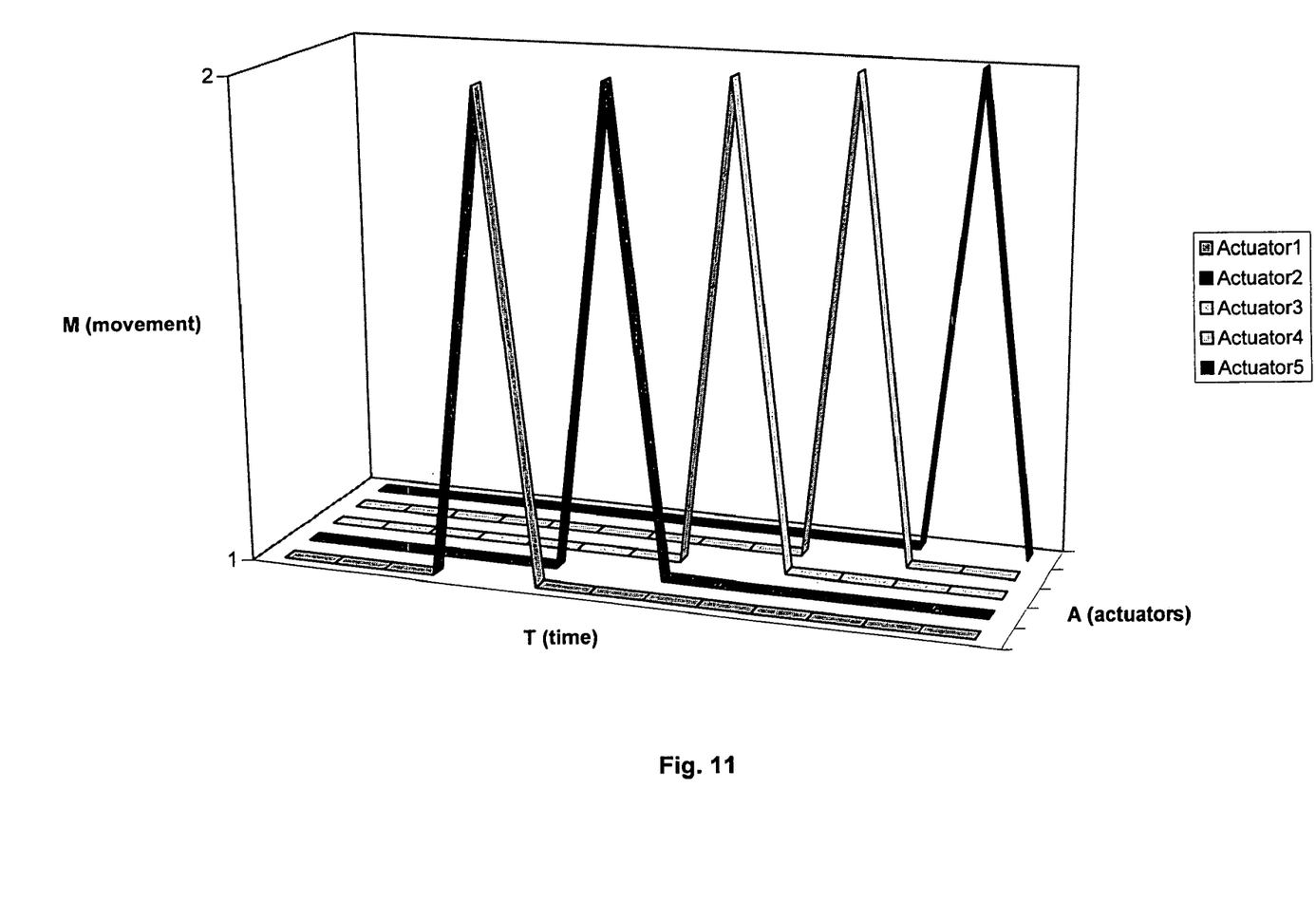

FIG. 11 is a graphic illustration of another possible embodiment of a vehicle seating system. The control period illustrated in FIG. 11 includes movement periods in which only one actuator is cycling through seating positions at a time. In certain embodiments, a first actuator cycles from a first position to a second position and back to a first position, with other actuators then following the same pattern. In such embodiments, each actuator includes periods of inactivity, with the overall control period including one continuous movement period with only one actuator cycling at a time.

Figure 12:
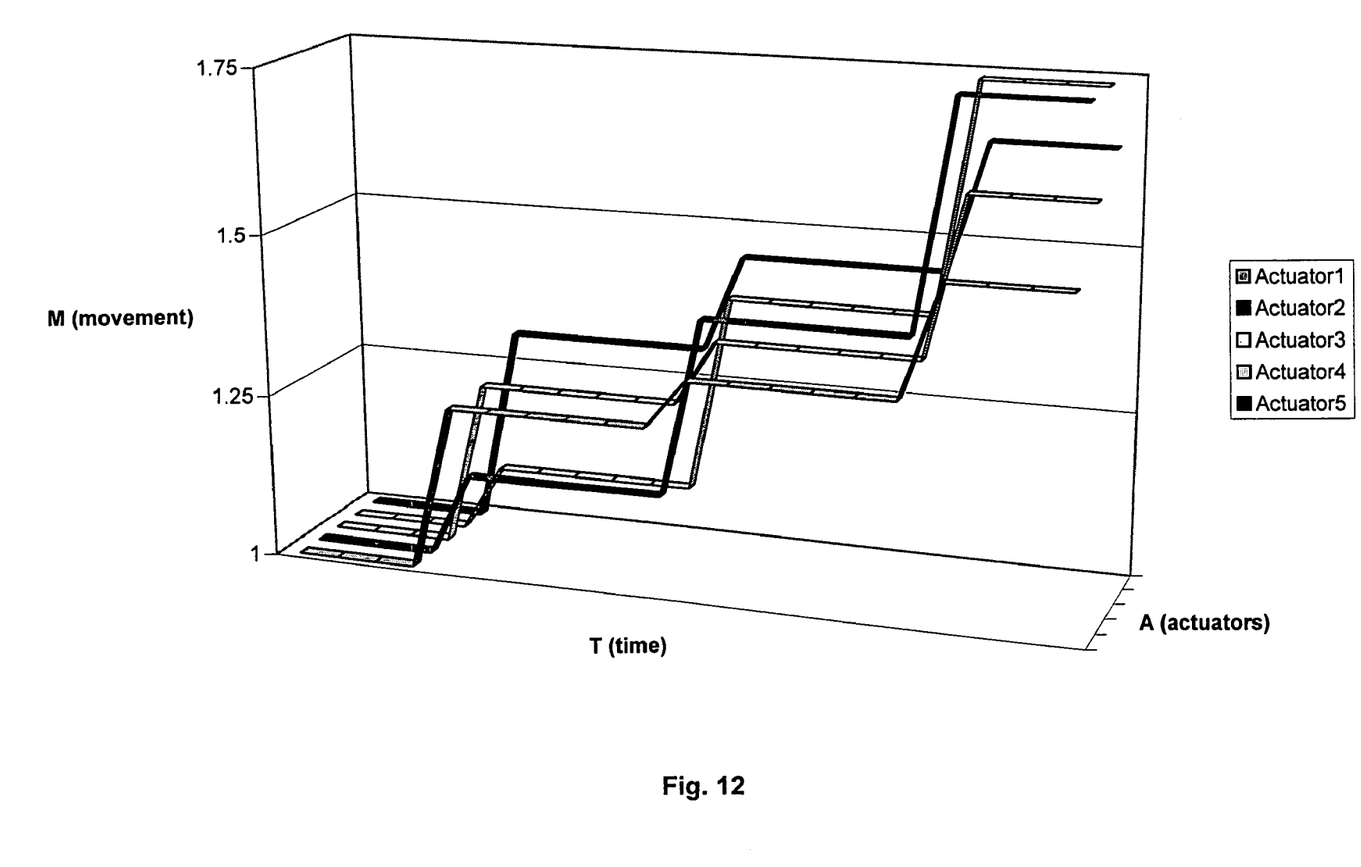

In the embodiment illustrated in FIG. 12, the control period includes alternating movement periods and stationary periods. The movement periods include movement of the actuators to specified predetermined positions, with stationary periods occurring therebetween. In certain preferred embodiments, a user of the system pre-selects one or more seating positions using a combination of positions of the actuators. In such embodiments, the movement periods cycle the actuators to the pre-selected seating positions with a slow movement average over the control period.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle seating system for reducing user fatigue, comprising:

a seat mountable in a vehicle having a seat back and a seat bottom;

at least two powered seat adjustment actuators including a seat back actuator to incline the seat back and a seat bottom actuator to tilt the seat bottom, each movable between a respective first position and a respective second position, for altering the seating position formed by said seat to reduce positional fatigue;

wherein said powered seat adjustment actuators reposition said seat to different seating positions with a slow movement average of less than about 10 centimeters per second between said first positions and said second positions; and an electrical controller for activating movement of said powered seat adjustment actuators, said electrical controller having a control period;

wherein said controller automatically activates said slow movement average of said powered seat adjustment actuators between said first and said second positions to incline the seat back forward and said slow movement average of said seat bottom actuator to tilt the seat bottom upward, and automatically activates said slow movement average of said seat back actuator to incline the seat back backward and said slow movement average of said seat bottom actuator to tilt the seat bottom downward to reduce positional fatigue.

2. The system of claim 1, wherein said electrical controller is preprogrammed with at least one preprogrammed profile for moving, as a function of time, said powered seat adjustment actuators between said first and said second positions in response to said preprogrammed profile.

3. The system of claim 1, wherein a transition time for each of said powered seat adjustment actuators to move from said first position to said second position is in the range of about 20 to about 40 seconds.

4. The system of claim 1, wherein selection of said different seating positions by the system is random.

5. The system of claim 1, wherein said powered seat adjustment actuators include a third actuator to control lumbar movement of said back portion of said seat.

6. The system of claim 1, wherein said electrical controller includes a computer chip to operate the system.

7. The system of claim 1, wherein after a first stationary time period, said actuators reposition said seat to said different seating positions, with a second stationary time period occurring after reaching each of said different seating positions.

8. The system of claim 1, wherein after a first stationary time period, said actuators continually cycle through said different seating positions.

9. The system of claim 1, wherein after a first stationary time period, said actuators cycle through said different seating positions, with a second stationary time period occurring when said actuators return to a first seating position.

10. The system of claim 1, wherein after a first stationary time period, the system cycles separately through each of said powered seat adjustment actuators.

11. A vehicle seating system for reducing user fatigue, comprising:

a seat mountable in a vehicle having a seat back and a seat bottom;

at least two powered seat adjustment actuators including a seat back actuator to incline the seat back and a seat bottom actuator to tilt the seat bottom, each movable independently of each other between a respective first position and a respective second position for altering the seating position formed by said seat to reduce positional fatigue;

wherein said powered seat adjustment actuators reposition said seat to different seating positions between said first positions and said second positions; and an electrical controller for activating movement of said powered seat adjustment actuators, said electrical controller having a control period; and, wherein said controller automatically activates said powered seat adjustment actuators between said first and said second positions to incline the seat back forward and said seat bottom actuator to tilt the seat bottom upward, and automatically activates said seat back actuator to incline the seat back backward and said seat bottom actuator to tilt the seat bottom downward to reduce positional fatigue.

12. The system of claim 11, wherein said control period includes a first stationary period at the beginning of said control period, wherein said stationary period includes static positioning of said actuators.

13. The system of claim 11, wherein said electrical controller includes a computer chip to operate the system; and, wherein said electrical controller is preprogrammed with at least one preprogrammed profile for moving, as a function of time, said powered seat adjustment actuators between said first and said second positions in response to said preprogrammed profile.

14. The system of claim 11, wherein said control period alternates between movement periods and stationary periods, said movement periods including movement between at least two different seating positions and returning to a first seating position.

15. The system of claim 11, wherein said control period includes one movement period, said one movement period including movement to continually reposition said seat.

16. The system of claim 11, wherein said control period alternates between movement periods and stationary periods, said movement periods including movement between at least two different seating positions, wherein for at least one movement period, the seating position at the beginning of the at least one movement period is different than the seating position reached at the end of the at least one movement period.

17. The system of claim 11, wherein said control period includes at least two movement periods, each movement period including movement of one of said powered seat adjustment actuators, wherein a first movement period includes movement of a first actuator and a second movement period includes movement of a second actuator.

18. The system of claim 17, wherein said control period includes a stationary period occurring between each of said at least two movement periods.

19. A method for reducing vehicle user fatigue, comprising:

providing a seat mountable in a vehicle having a seat back and a seat bottom;

providing at least two powered seat adjustment actuators including a seat back actuator to incline the seat back and a seat bottom actuator to tilt the seat bottom, each movable between a respective first position and a respective second position for altering the seating position formed by said seat to reduce positional fatigue;

activating movement of said powered seat adjustment actuators with an electrical controller having a control period including at least one movement period; and said activating movement including activating at least one of said powered seat adjustment actuators to reposition said seat to different seating positions during said at least one movement period, wherein movement of said powered seat adjustment actuators includes a slow movement average of less than about ten centimeters per second from said first position to said second position; and, wherein said controller automatically activates said powered seat adjustment actuators between said first and said second positions to incline the seat back forward and said seat bottom actuator to tilt the seat bottom upward, and automatically activates said seat back actuator to incline the seat back backward and said seat bottom actuator to tilt the seat bottom downward to reduce positional fatigue.

20. The method of claim 19, wherein said control period includes at least one stationary period of at least 5 minutes.

21. The method of claim 20, comprising said controller alternating between said movement periods and said stationary periods, said control period including at least two movement periods.

22. The method of claim 19, wherein the system automatically activates at least one of said powered seat adjustment actuators after a first stationary time period.

23. The method of claim 19, wherein said electrical controller is preprogrammed with at least one preprogrammed profile for moving, as a function of time, said powered seat adjustment actuators between said first and said second positions in response to said preprogrammed profile.

* * * * *